No. 749,852. PATENTED JAN. 19, 1904.
A. F. DUNN.
HOOK.
APPLICATION FILED MAR. 16, 1903.
NO MODEL.
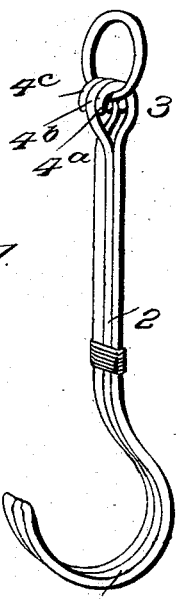
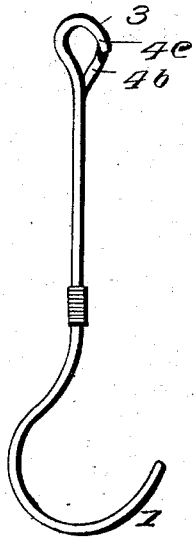
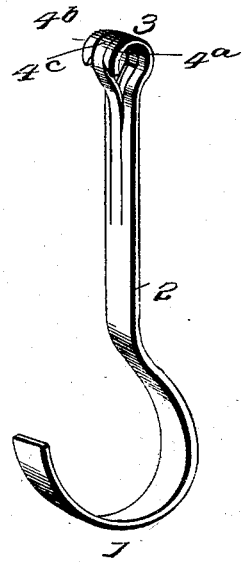
Witnesses
Inventor
A. F. Dunn
By R. S. & A. B. Lacey
Attorneys No. 749,852. Patented January 19, 1904.

UNITED STATES PATENT OFFICE.

ALFRED FREEMAN DUNN, OF MOOAR, IOWA.

HOOK.

SPECIFICATION forming part of Letters Patent No. 749,852, dated January 19, 1904.

Application filed March 16, 1903. Serial No. 148,014. (No model.)

*To all whom it may concern:*

Be it known that I, ALFRED FREEMAN DUNN, a citizen of the United States, residing at Mooar, in the county of Lee and State of Iowa, have invented certain new and useful Improvements in Hooks, of which the following is a specification.

This invention is designed to provide a simple form of suspending-hook, preferably for use on harness and in supporting paint-buckets from the ladder in a manner which will be readily seen. It will be understood, however, that the device is adapted for various other uses within the spirit of the invention.

The invention lies in the peculiar form of the attaching-eye disposed upon the shank of the device, same being adapted to be readily engaged and disengaged with that to which the hook is applied.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view showing a ring disposed in the several jaws of the attaching portion of the hook. Fig. 2 is a side elevation. Fig. 3 is a modified form of the improvement. Fig. 4 is a perspective view of the upper portion of the shank of the hook, showing a further modification.

Corresponding and like parts are referred to in the following description and indicated in all the views of the drawings by the same reference characters.

In the ordinary form of suspending-hook the hook is usually formed with an attaching-loop at the end portion of its shank, through which is passed a strap or the like by which the hook is suspended. The improvement embodied in this invention relates to a special form of this attaching-loop providing a loop of special form which may be directly interlocked with an article without the necessity of passing or threading the latter through the loop.

The hook comprises the ordinary bill 1 and shank 2. A loop 3 is formed of oppositely-disposed spring-jaws $4^a$, $4^b$, and $4^c$. The preferred form of hook is shown as constructed of three lengths of wire rigidly connected together at the shank portion, two of the said lengths of wire being bent at their upper ends to form the jaws $4^a$ and $4^c$ and the central wire also bent after the same manner as the aforementioned wires, but oppositely, to form the jaw $4^b$. It is necessary that these several jaws have a springing action to and from each other to a certain extent and laterally also.

It is contemplated by me that the body of the hook may be formed from a single metallic piece, as shown in a modified form of the device illustrated in Fig. 4 of the drawings. Here the upper portion of the shank consists of three separate members having the same disposal of the spring-jaws as shown in the other figures of the drawings. The number of the said jaws also may be changed within the purview of the invention; but the device is shown in its preferred embodiment as having but three of these spring-jaws. To attach the part 3 to a ring or the like, it is but necessary to introduce the same between two of the jaws and by a downward and upward movement bring the same in proper position inclosed by all of the said jaws. As above indicated, the jaws are adapted to spring laterally and to some extent forward and backward, as will be readily comprehended.

The hook is simple in construction and cheap in manufacture, and the same may be modified relative to the exact form of the parts in accordance with the broad scope of the invention as determined by the appended claim.

Having thus described the invention, what is claimed as new is—

5. In a hook, a shank composed of spring members arranged side by side in the same plane and having their free ends alternately bent in opposite directions to form an eye, said bent ends being free to move in or out with reference to the plane of the shank, substantially as described.

In testimony whereof I affix my signature in presence of two witnesses.

ALFRED FREEMAN DUNN. [L. S.]

Witnesses:
B. DEILING,
JAMES GALLOWAY.